May 21, 1968  H. R. CORWIN  3,383,936
LIGHT-WEIGHT ROTOR AND GEAR ASSEMBLY FOR ROTARY MECHANISMS
Filed Feb. 13, 1967  2 Sheets-Sheet 1

INVENTOR.
HOWARD RUSSELL CORWIN
BY
*William V. Ebs*
ATTORNEY

United States Patent Office 3,383,936
Patented May 21, 1968

3,383,936
LIGHT-WEIGHT ROTOR AND GEAR ASSEMBLY
FOR ROTARY MECHANISMS
Howard Russell Corwin, North Caldwell, N.J., assignor to
Curtiss-Wright Corporation, a corporation of Delaware
Filed Feb. 13, 1967, Ser. No. 615,468
6 Claims. (Cl. 74—433)

ABSTRACT OF THE DISCLOSURE

In a rotor and gear assembly for rotary mechanisms, the rotor and gear are secured against relative rotation by interlocking splines which are formed to prevent their separation despite thermal expansion of the rotor relative to the gear, and the rotor and gear are secured against relative axial movement by flexible members which cushion loading shock to the gear.

Summary of the invention

My invention relates to rotary mechanisms for fluid pumps, fluid motors, combustion engines or the like. More particularly, the invention is directed to a rotor and gear assembly for such rotary mechanisms.

Rotor and timing gear assemblies for rotary mechanisms are preferably light in weight and durable in operation. Weight considerations are, of course, especially important in the case of rotary mechanisms intended for use in aircraft. By forming the rotor and timing gear for a rotary mechanism as a single piece, it can be made lighter in weight than if the rotor and gear are formed as separate parts and assembled in a conventional manner. The integral construction is unsuitable, however, since the material required for the rotor does not lend sufficient strength to the gear. A suitable construction for many purposes is the assembly shown in the copending patent application of Charles Jones for Rotor and Gear Assembly for Rotary Mechanisms, Ser. No. 596,845, wherein the gear and rotor are assembled at relatively few points, and the gear is piloted on the rotor hub. Such assembly is unsuited to a wide rotor, however, since providing a rotor pilot for the gear in such case involves extending either the gear or hub with considerable weight addition.

It is an object of the invention to provide an improved light-weight, simply-constructed rotor and gear assembly for rotary mechanisms especially rotary mechanisms having wide rotors where it is impractical to pilot the gear on the rotor hub.

It is another object of the invention to provide an improved light-weight rotor and gear assembly for rotary mechanisms not requiring the use of closely-fitted pins.

It is still another object of the invention to provide a rotor and gear assembly for rotary mechanisms in which the rotor and gear are flexibly connected to withstand gear-tooth loading shock.

It is yet another object of the invention to provide a rotor and gear assembly for rotary mechanisms especially effective to maintain the gear centered although the rotor thermally expands relative to the gear.

It is also an object of the invention to provide a rotor and gear assembly for rotary mechanisms in which the rotor and gear are assembled to minimize the possibility of the assembly being damaged as the result of thermal expansion of the rotor relative to the gear.

Other objects and advantages of the invention will become apparent hereinafter during a reading of the specification in connection with the accompanying drawings.

Detailed description

Figure 1:
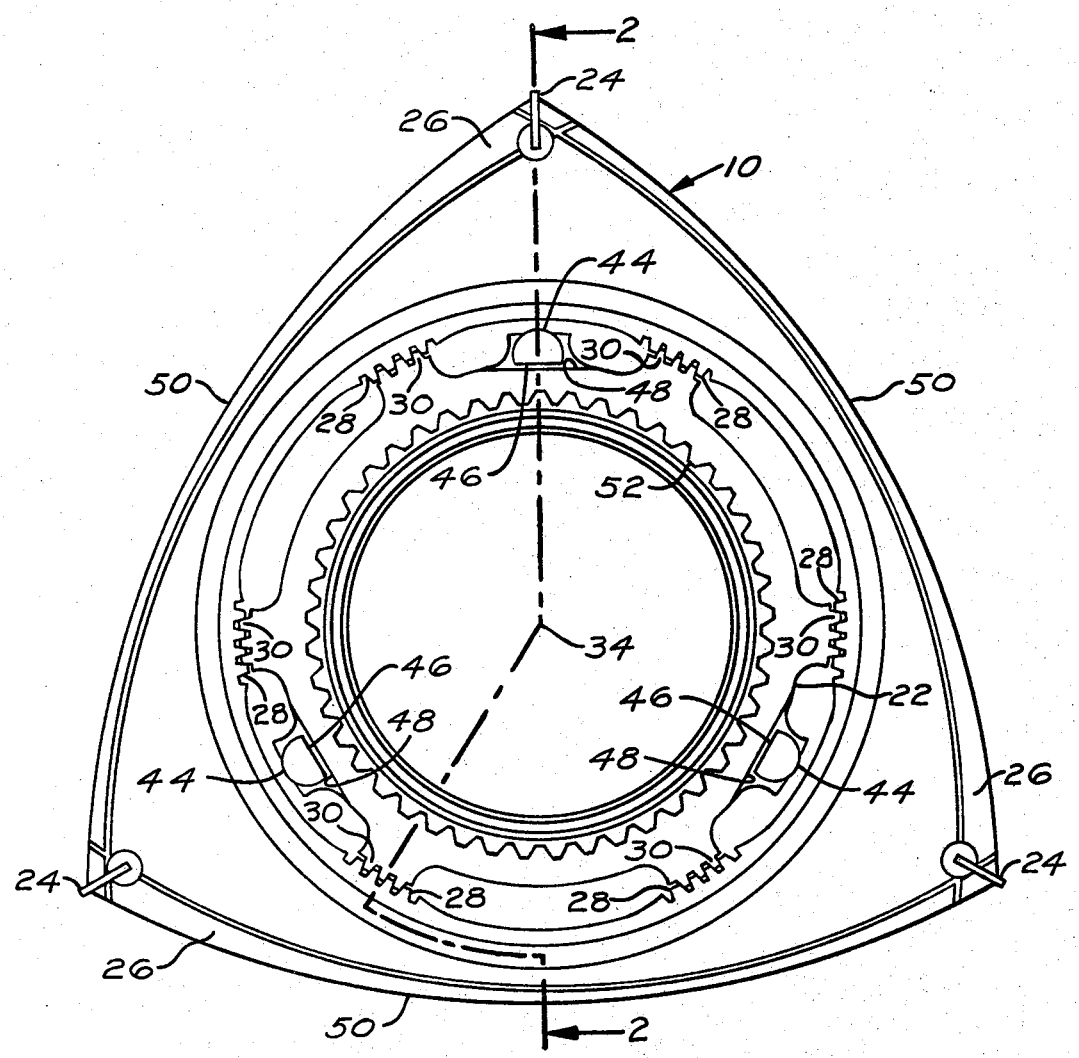
FIG. 1 is an end view of a rotor and gear assembly embodying the features of the invention.
Figure 2:
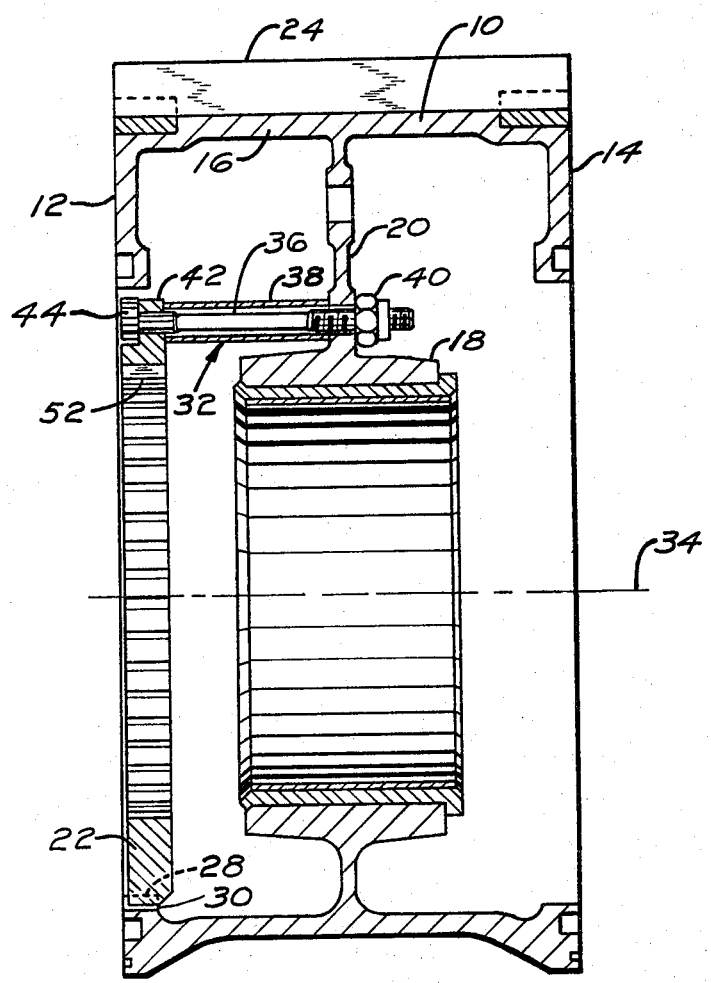
FIG. 2 is a sectional view taken on the plane of the line 2—2 of FIG. 1.

Referring to the drawings, reference character 10 designates a rotor for a rotary combustion engine of the type disclosed for example in Patent No. 2,988,065 for Rotary Internal Combustion Engine, issued June 13, 1961. The rotor 10 includes end walls 12 and 14, peripheral wall 16 integrally connected with the end walls, hub 18, and a web 20 which is integrally connected with the hub and peripheral wall. A gear 22 is assembled to rotor 10. The function of the gear is to index the rotor in its operation in the engine. Although the gear is not provided to transmit power, the gear is nevertheless subjected to cyclically varying loads in an operating engine due to frictional drag on sealing elements 24 located in the rotor apex portions 26, acceleration and deceleration of the rotor relative to the main shaft of the engine, gear backlash, and movement of the rotor across bearing clearance. The rotor 10 and gear 22 are assembled in accordance with the invention to minimize the possibility of structural failures of the type heretofore experienced in rotor and gear assemblies due to a combination of cyclically varying loads and thermally induced stresses.

As shown, the rotor 10 includes intermittently spaced internal splines 28 in the end wall 12, and the gear 22 includes intermittently spaced external splines 30 for engaging the internal splines of the rotor. The splines 28 and 30 are dimensioned to provide an interference fit at engaging side surfaces of interlocking splines, and the rotor and gear are initially assembled as by expanding the rotor with heat, sliding it over the gear, and permitting the rotor to cool so as to cause it to shrink into place on the gear. Preferably the splines are so formed that the angle of inclination of each side surface of a spline with respect to a radial mid-line through the spline is no greater than about 45°. In any event, the interference fit and angle of inclination of the side surfaces of the splines are selected so as to maintain side surfaces of the splines 28 and 30 in contact at operating temperatures within an engine despite thermal expansion of the rotor relative to the gear.

The rotor and gear are connected not only by splines 28 and 30 but also by fastening means 32 provided at a plurality of locations equiangularly spaced around the rotor and gear axes which coincide at 34. Preferably the fastening means are provided at only three locations as shown. As shown, each fastening means includes a long, flexible bolt 36, a tubular sleeve 38, and a nut 40. One end portion of the bolt 36 extends through a boss 42 on the gear 22 and terminates in a head 44 having a flat surface 46 thereon engagable with an opposing surface 48 on the gear to prevent the bolt from turning. The other end portion of the bolt 36 extends through web 20 and is threaded to receive nut 40. The nut is screwed tightly upon the bolt to draw the gear firmly against tubular sleeve 38 which surrounds the bolt to thereby fix the axial portion of the gear relative to the rotor. Axial movement of the gear 22 toward the rotor hub is then prevented by the sleeve 38 and axial movement of the gear away from the hub is prevented by the nut 40. Alternatively the tubular sleeve 38 may be eliminated and relative axial movement of the gear and rotor prevented by having the bolt 36 positively affixed in any suitable manner at one end to the gear to prevent relative axial movement of the gear and bolt, and at the other end to the web 20 to prevent relative axial movement of the bolt and rotor.

In rotary combustion engines, the rotor of a rotor and gear assembly tends to expand relative to the gear because it is directly exposed to the combustion gases. If the rotor is constructed of a light-weight material such as aluminum having a higher coefficient of expansion than the gear which is generally formed of a durable material such as steel, the rotor will also tend to expand relative to the gear because of the different effect of a temperature change on each. It is an important feature of this invention that the rotor 10 can expand relative to the gear 22 at the elevated temperatures experienced in an engine without endangering the structural integrity of the assembly either by separation of the parts due to relative thermal distortion or by the creation of undue stress at the points where the rotor and gear connect. As noted hereinbefore, the splines are provided with an interference fit and formed at an angle such as to maintain engaging surfaces in contact at operating temperatures in an engine. Torque loads carried by the splines under operating conditions in an engine are, therefore, not transferred to the fastening means 32 despite expansion of the rotor relative to the gear.

Continuous splines might be used around the gear and rotor rather than the intermittent splines 28 and 30 described. However, it is preferable to provide intermittent splines and eliminate metal between groups of splines to thereby minimize the weight of the rotor and gear assembly. Also it is desirable to avoid having splines in those regions of the assembly which are closest to the arcuate surfaces 50 of the rotor and therefore, subject to the greatest variation in temperature in an operating engine.

Thermal distortion of the rotor is not transferred in any significant degree through the fastening means 32 to the gear 22, but is taken up by flexure of the bolts 36. Furthermore, because of the equiangular disposition of the bolts around the gear and their positions in correponding parts of the rotor (parts subject to like distortion), any forces imparted to the gear through the bolts balance out. The concentricity of the gear with respect to the rotor is, therefore, maintained. Because of their flexibility, the bolts 36 also cushion loading shocks to the gear due to cyclic fluctuations in load and so lessen the likelihood of damage to the gear teeth 52.

While only one form of the device incorporating the features of the invention has been shown, it will be apparent that various changes and modifications may be made therein without departing from the spirit and scope of the invention as set forth in the appended claims.

What is claimed is:

1. In a rotary mechanism, the combination comprising a rotor having internal splines and including a rotor hub for receiving a rotatable member, an internal ring gear concentric to the rotor including external splines which interlock with the internal splines of the rotor, and flexible securing means between the gear and rotor for affixing the gear against axial movement relative to the rotor in a position apart from the hub.

2. The combination of claim 1 wherein the interlocking splines are arranged in discrete groups about the rotor axis.

3. The combination of claim 1 wherein the external splines of the rotor have an interference fit with the external splines of the gear and each of the side surfaces of the splines extends at an angle of less than 45° with respect to a line passing through the axis of the gear and bisecting the spline.

4. The combination of claim 1 wherein the flexible securing means comprises a plurality of fastening means disposed about the rotor axis.

5. The combination of claim 4 wherein the fastening means are equiangularly disposed about the rotor axis.

6. The combination of claim 4 wherein each fastening means includes a tubular member which secures the gear against axial movement toward the hub and an elongated bolt within such tubular member for securing the gear against axial movement away from the hub.

References Cited

UNITED STATES PATENTS

| 3,111,261 | 11/1963 | Bentele et al. | 123—8 X |
| 3,230,789 | 1/1966 | Jones | 74—431 |
| 3,323,497 | 6/1967 | Paschke | 230—145 X |

DONLEY J. STOCKING, *Primary Examiner.*

LEONARD H. GERIN, *Examiner.*